United States Patent
Lyubarsky et al.

(10) Patent No.: US 10,915,010 B2
(45) Date of Patent: Feb. 9, 2021

(54) PROJECTION SYSTEM WITH OFFSET IMAGE

(71) Applicant: Texas Instruments Incorporated, Dallas, TX (US)

(72) Inventors: Alexander Lyubarsky, Dallas, TX (US); John Marshall Ferri, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/450,156

(22) Filed: Jun. 24, 2019

(65) Prior Publication Data

US 2020/0004117 A1 Jan. 2, 2020

Related U.S. Application Data

(60) Provisional application No. 62/692,146, filed on Jun. 29, 2018.

(51) Int. Cl.
*G03B 21/14* (2006.01)
*G03B 21/00* (2006.01)
*G03B 21/26* (2006.01)

(52) U.S. Cl.
CPC ......... *G03B 21/147* (2013.01); *G03B 21/008* (2013.01); *G03B 21/26* (2013.01)

(58) Field of Classification Search
CPC .... G03B 21/008; G03B 21/28; G03B 21/142; G03B 21/145; G03B 21/147
See application file for complete search history.

(56) References Cited

U.S. PATENT DOCUMENTS

| 7,140,735 | B2* | 11/2006 | Peterson | G03B 21/06 353/69 |
| 2004/0001254 | A1* | 1/2004 | Shimizu | G03B 21/625 359/449 |
| 2004/0141157 | A1* | 7/2004 | Ramachandran | G02B 17/06 353/70 |
| 2008/0297726 | A1* | 12/2008 | Rodriguez, Jr. | G03B 21/14 353/13 |
| 2009/0231563 | A1* | 9/2009 | Staals | G03F 7/70725 355/53 |
| 2010/0103384 | A1* | 4/2010 | Chang | G03B 21/28 353/70 |

(Continued)

OTHER PUBLICATIONS

International Search Report for PCT/US2019/040165 dated Nov. 17, 2019.

*Primary Examiner* — Sultan Chowdhury
(74) *Attorney, Agent, or Firm* — Michelle F. Murray; Charles A. Brill; Frank D. Cimino

(57) ABSTRACT

Described examples include a projection system having projection optics with a projection optics axis tilted from an axis perpendicular to an image target, the projection optics configured to project an image. The projection system also having an image source, the image source configured to provide the image, the image source having an offset from the projection optics axis, a plane of the image source having an angle from perpendicular to the projection optics axis such that a projected image from the image source projected by the projection optics is focused onto the image target along an extent of the projected image.

20 Claims, 8 Drawing Sheets

(56) References Cited

U.S. PATENT DOCUMENTS

| | | | |
|---|---|---|---|
| 2010/0141902 A1* | 6/2010 | Destain | G03B 21/14 353/69 |
| 2012/0212841 A1 | 8/2012 | Wang et al. | |
| 2015/0062696 A1 | 3/2015 | Tatsuno et al. | |
| 2018/0003964 A1 | 1/2018 | Tatsuno | |
| 2018/0003970 A1 | 1/2018 | Tatsuno | |

* cited by examiner

PROJECTION SYSTEM WITH OFFSET IMAGE

CROSS-REFERENCE TO RELATED APPLICATIONS

This application claims the benefit under 35 U.S.C. § 119(e) to co-owned U.S. Provisional Patent Application Ser. No. 62/692,146, filed Jun. 29, 2018, entitled "SIZE AND COMPLEXITY REDUCTION OF A PROJECTION LENS FOR AN OFFSET IMAGE," which is hereby incorporated by reference in its entirety herein.

TECHNICAL FIELD

This relates generally to optical devices, and in particular to projection systems.

BACKGROUND

An image offset in a projection system is where the image source, such as a spatial light modulator that modulates light for the image, is offset from the optical axis of a projection lens. This produces an offset image from the projection optics. The projected image from the projection optics is often offset in a direction diametrically opposite to the offset of the input image and is offset by a distance proportional to the input offset. Image offset is often useful in compact projection systems where the projected image must clear part of the projection system itself or with ultra-short throw systems where the projector cannot be directly in front of the projected image.

Image offset requires a projection lens to be large due to the increase in field size to accommodate the offset position of the image source. That is, because the image enters the projection optics offset from the center of the projection optics, the projection optics must be large enough to accommodate the image received by the projection optics plus the offset distance. In addition, the image cannot enter the projection optics too close to the edge of the projection optics to avoid unacceptable distortion of the image. Offset image processing also requires an increase in the lens count to minimize the aberrations of the system due to the large field size. These factors result in expensive, large, and complex projection optics.

SUMMARY

In accordance with an example, a projection system includes projection optics having a projection optics axis tilted from an axis perpendicular to an image target, the projection optics configured to project an image. The projection system also includes an image source, the image source configured to provide the image, the image source having an offset from the projection optics axis, a plane of the image source having an angle from perpendicular to the projection optics axis such that a projected image from the image source projected by the projection optics is focused onto the image target along an extent of the projected image.

DETAILED DESCRIPTION

Corresponding numerals and symbols in the different figures generally refer to corresponding parts unless otherwise indicated. The figures are not necessarily drawn to scale.

In described examples, arrangements solve the problem of providing large projection optics in projection systems using an image offset. In an example, a projection system includes projection optics having a projection optics axis tilted from an axis perpendicular to an image target, the projection optics configured to project an image. The projection system also includes an image source, the image source configured to provide the image, the image source having an offset from the projection optics axis, a plane of the image source having an angle from perpendicular to the projection optics axis such that a projected image from the image source projected by the projection optics is focused onto the image target along an extent of the projected image.

Figure 1:
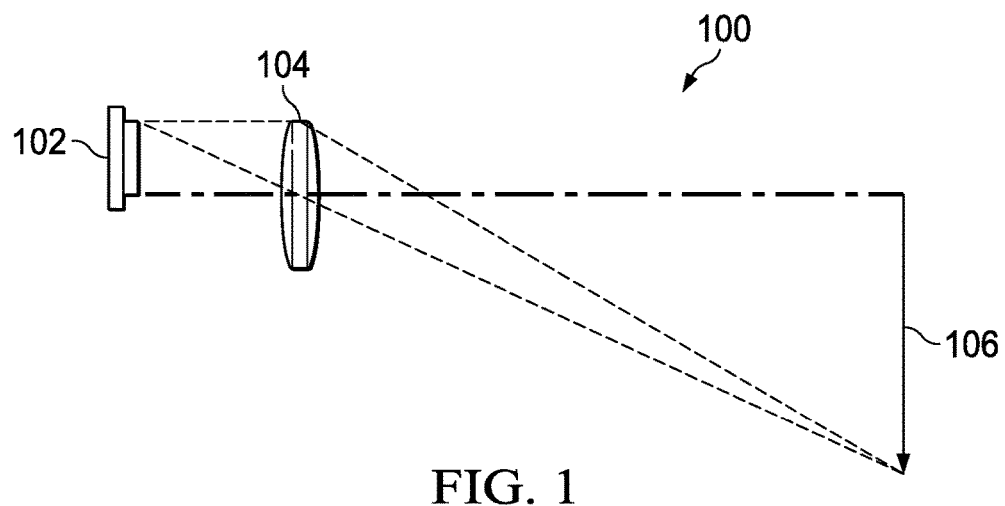
FIG. 1 is an illustration of a projection system.

FIG. 1 is an illustration of a projection system 100. Spatial light modulator 102 has one edge on the central axis of projection optics 104. FIG. 1 shows projection optics 104 as a single lens. Other figures discussed herein also show the projection optics as a single lens. However, in examples, projection optics 104 and the other examples of projection optics discussed herein are multiple lenses to provide image correction, zooming and focus functions. Spatial light modulator 102 serves as an image source by selectively providing light from pixel positions on spatial light modulator. In an example, spatial light modulator 102 is a digital micromirror device (DMD) that selectively reflects light from a light source (not shown). In this example, projection optics 104 reverses the image provided by spatial light modulator 102 to provide image 106 as shown in FIG. 1. Projection optics 104 must be large enough so that the top of the image provided by spatial light modulator 102 is within the field size of projection optics 104.

Figure 2:
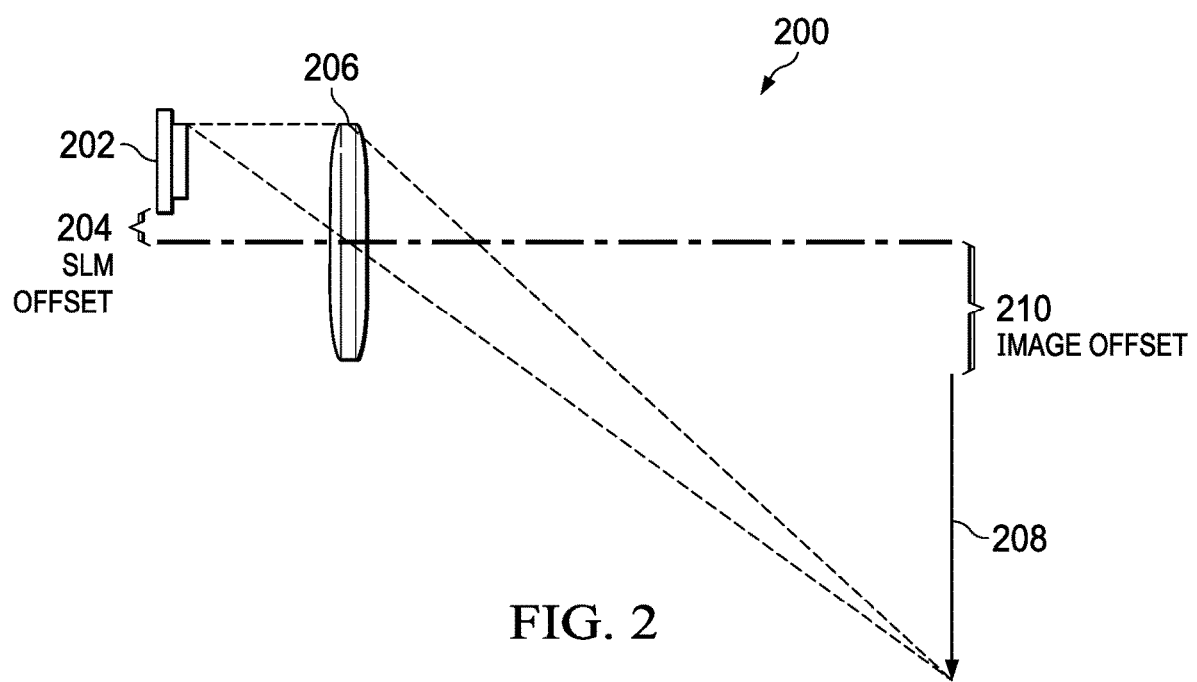
FIG. 2 is an illustration of another projection system.

FIG. 2 is an illustration of another projection system 200. Spatial light modulator 202 is further offset from the optical axis of projection optics 206 by an offset 204. The image from spatial light modulator projects as image 208, which is offset from the optical axis of projection optics 206 by an image offset 210. The size of image offset 210 is a determined by the size of offset 204; the distance from the spatial light modulator 202 to projection optics 206; the distance from projection optics 206 to image 208; and the magnification of the projection optics 206. In addition, the size of projection optics 206 is increased by twice the image offset 204 so that the top of the image provided by spatial light modulator 202 is within the field size of projection optics 206.

Figure 3:
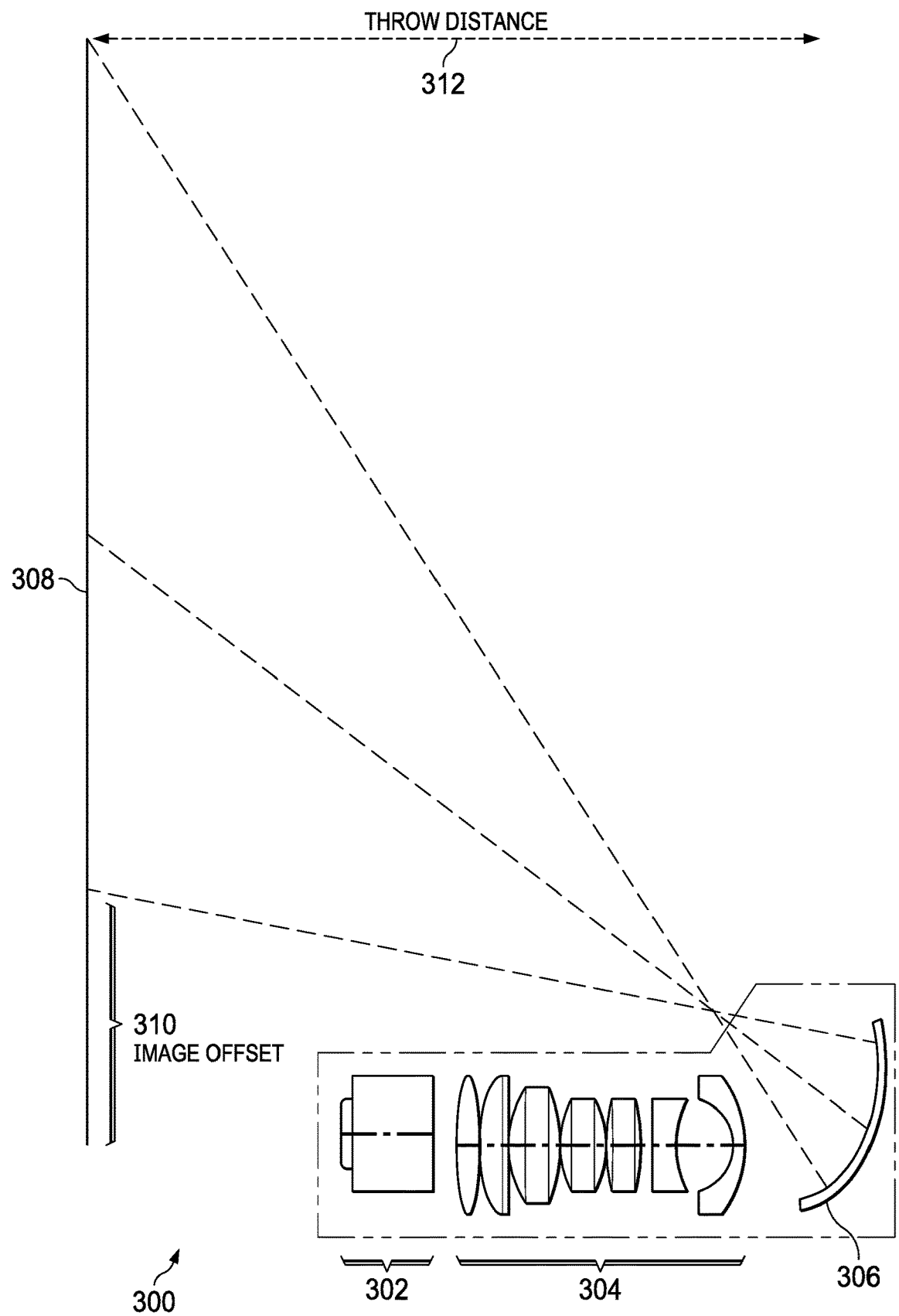
FIG. 3 is an illustration of an ultra-short throw projection system.

FIG. 3 is an illustration of an ultra-short throw projections system 300. Spatial light modulator 302 is offset from projection optics 304. The image reflects off concave mirror 306 to image plane 308. Spatial light modulator 302 is offset upward relative to the page, so the image is offset downward onto mirror 306. This offset with the angle of concave mirror 306 offsets the image from the axis of the projection optics 304 by an image offset 310. The position of ultra-short throw projection system 300 from the image plane 308 is a throw distance 312. The use of concave mirror 306 adds bulk and expense to ultra-short throw projection system 300.

Figure 4:
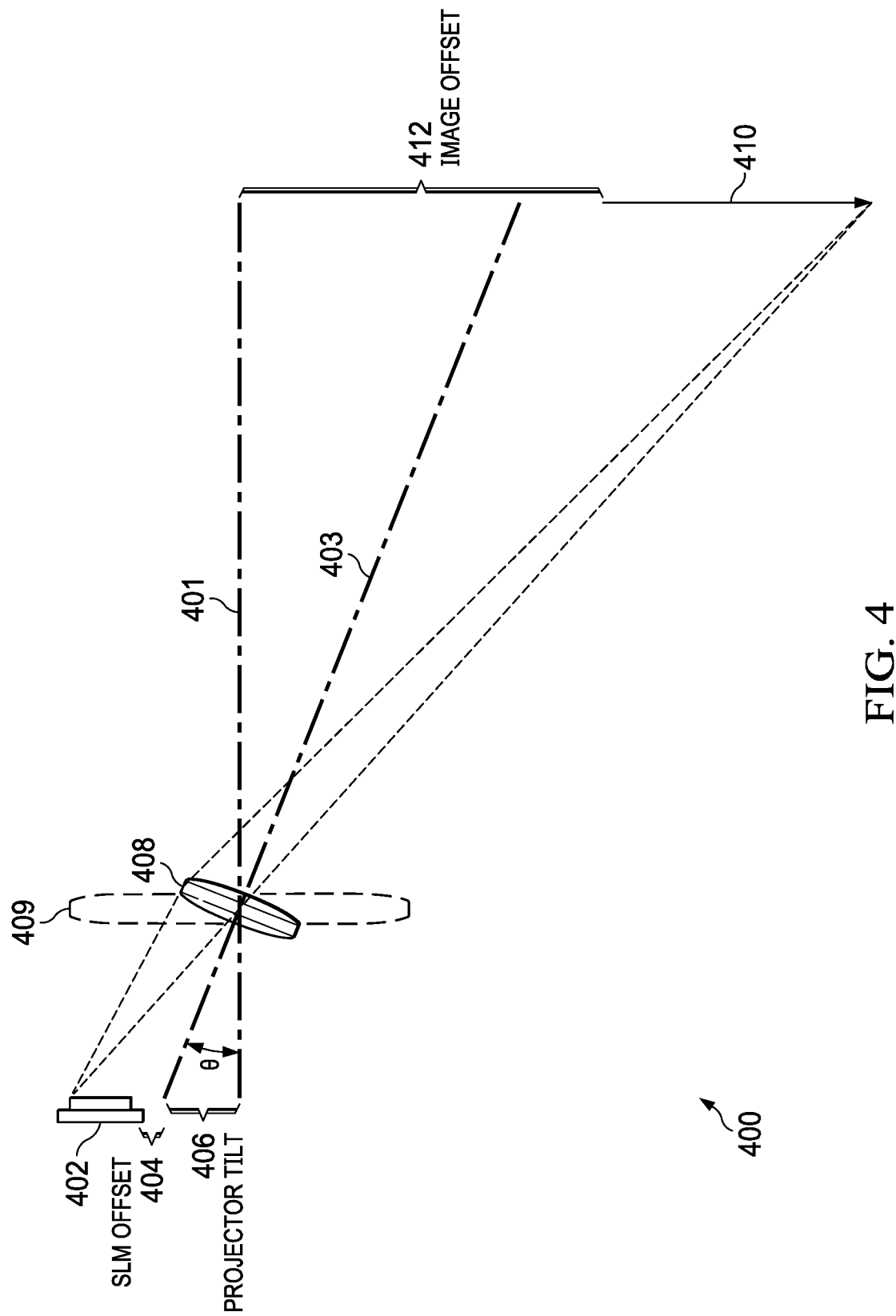
FIG. 4 is an illustration of an example projection system.

FIG. 4 is an illustration of an example projection system 400. In projection system 400, the optical axis 403 of projection optics 408 tilts at an angle θ relative to the optical axis 401 of projection system 400. Therefore, spatial light modulator 402 is offset from the optical axis 401 of projection system 400 by two amounts: offset 404 is an offset of spatial light modulator 402 from the optical axis 403 of the projection optics 408; and projector tilt 406 is an offset amount determined by the angle of the tilt θ of projection optics 408 relative to the optical axis 401 of projection system 400 and the distance from spatial light modulator 402 to projection optics 408. These offsets combine to produce a desired image offset 412 of image 410. With projection system 400, projection optics 408 is smaller relative to the image offset 412, because the offset 404 is only part of the combined image offset produced by projector tilt 406 and offset 404. Projection optics 409 in FIG. 4 shows the size of the projection optics that would be necessary without projector tilt 406. However, because spatial light modulator 402 and image 410 are not perpendicular to the optical axis of projection optics 408, Scheimpflug defocusing issues will occur. In addition, because spatial light modulator 402 and image 410 are not perpendicular to the optical axis of projection optics 408, keystoning issues will occur. Correcting these issues is explained hereinbelow.

Figure 5:
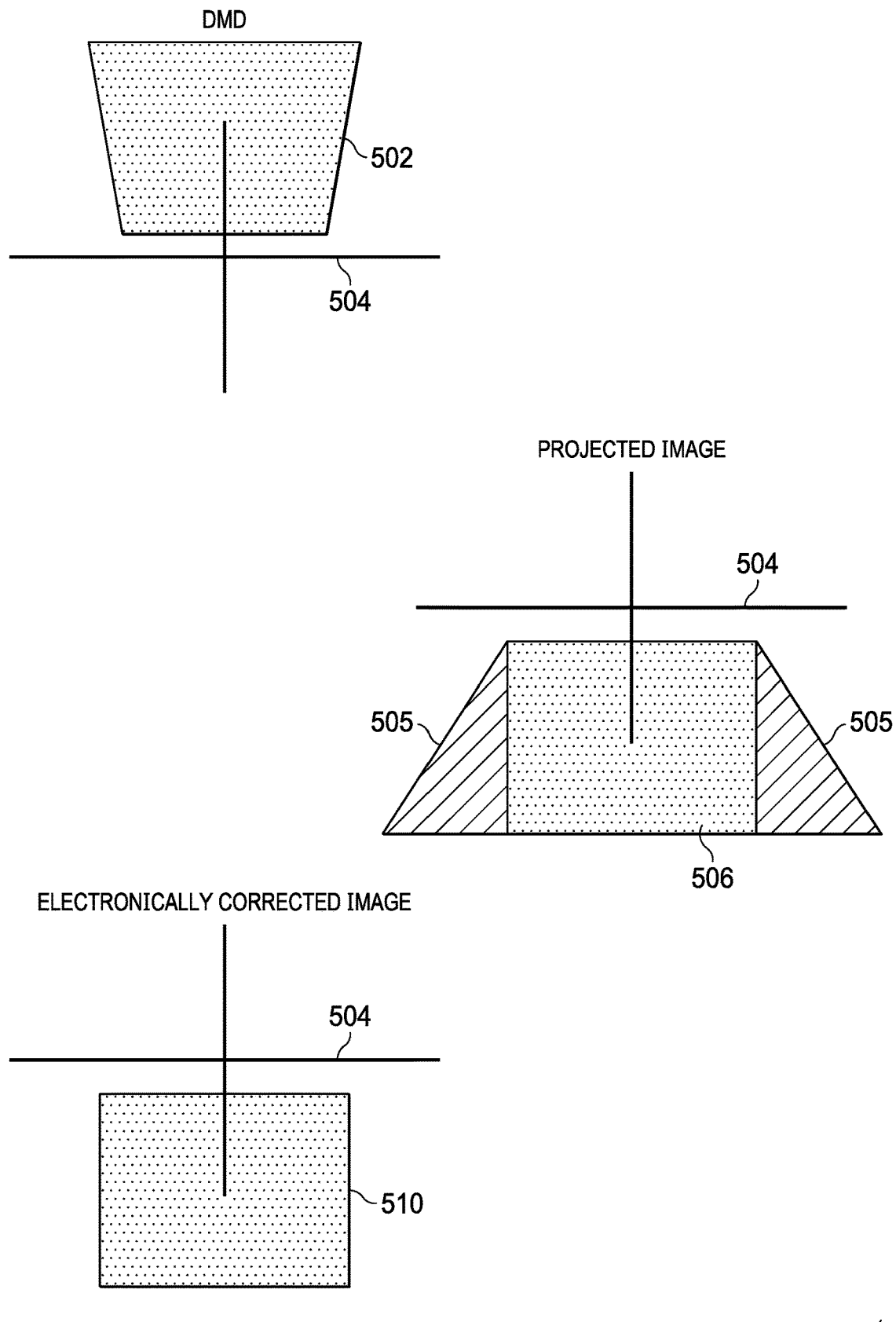
FIG. 5 is a diagram illustrating the problem of keystoning.

FIG. 5 is a diagram illustrating the problem of keystoning. Image 502 is the image from spatial light modulator 402 (FIG. 4) from the perspective 504 of the optical axis 401 of projection system 400 (FIG. 4). From this perspective, image 502 has a trapezoidal or keystone shape. This image results in a trapezoidal projected image 506 relative to perspective 504. This problem can be corrected electronically by providing an image to spatial light modulator 402 (FIG. 4) that projects corrected projected image 510 that is corrected for keystoning. However, such electronic correction removes the image from the area of the spatial light modulator 402 (FIG. 4) represented by triangles 505 and compresses that part of the image so that it will properly project as corrected image 510. Thus, the light output associated with the pixels in triangles 505 that are unused in correcting the keystone image is lost, and thus a portion of the image brightness and resolution is lost. As explained hereinbelow, by choosing configuration options, this loss can be mitigated while still providing a significant reduction in size of the projection optics.

Figure 6:
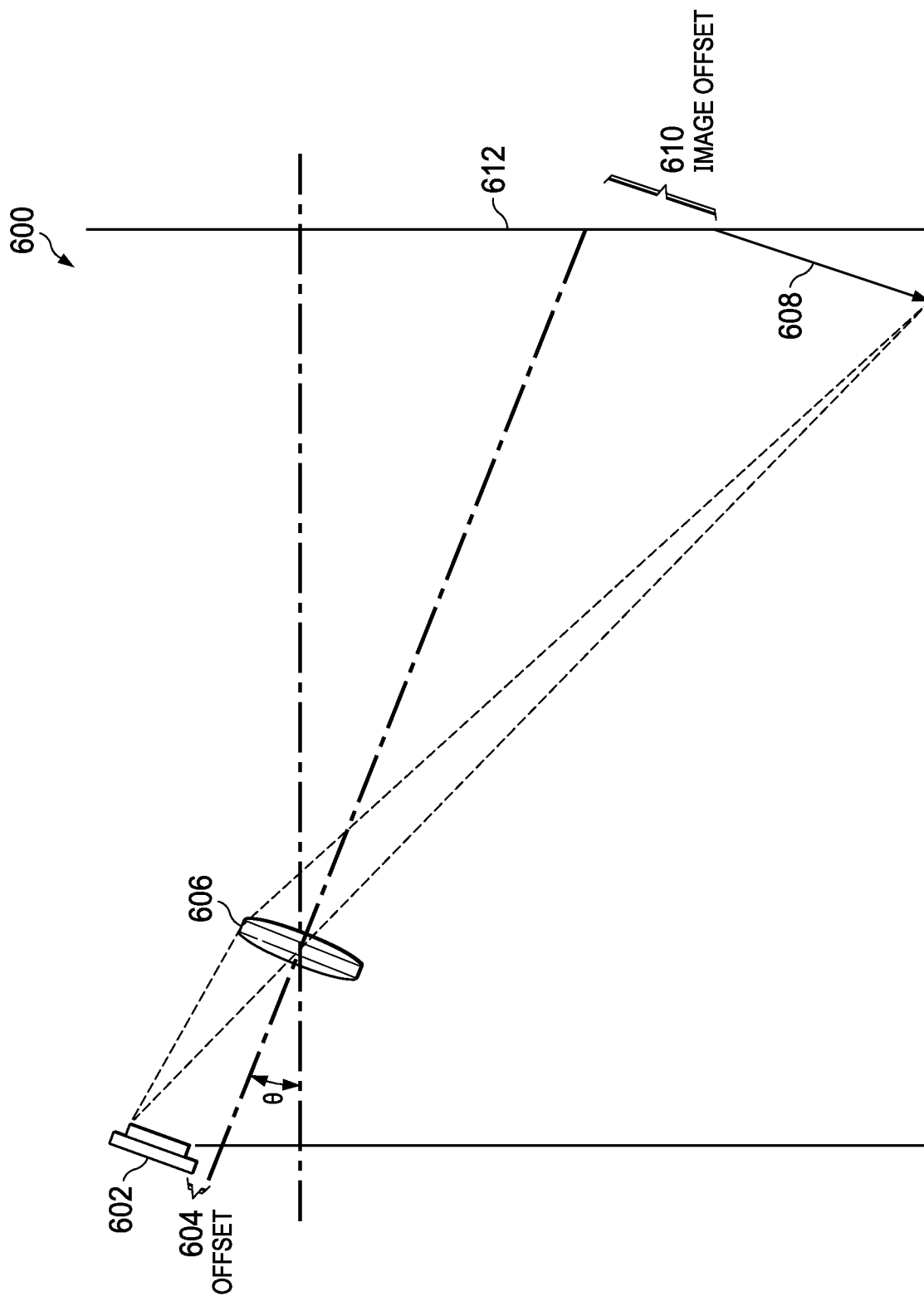
FIG. 6 is a diagram illustrating a Scheimpflug defocusing issue with an example projection system.

FIG. 6 is a diagram illustrating a Scheimpflug defocusing issue with an example projection system 600. Projected image 608 shows the position where projection optics 606 focuses the image of spatial light modulator 602. The combination if tilt angle θ with spatial light modulator offset 604 produces image offset 610. However, projected image 608 projects on to image target 612. Therefore, the only focused part of projected image 608 is where projected image 608 intersects with image target 612. Focus issues caused by a projection onto a plane that is not perpendicular to the projector is explained by the Scheimpflug principle.

Figure 7:
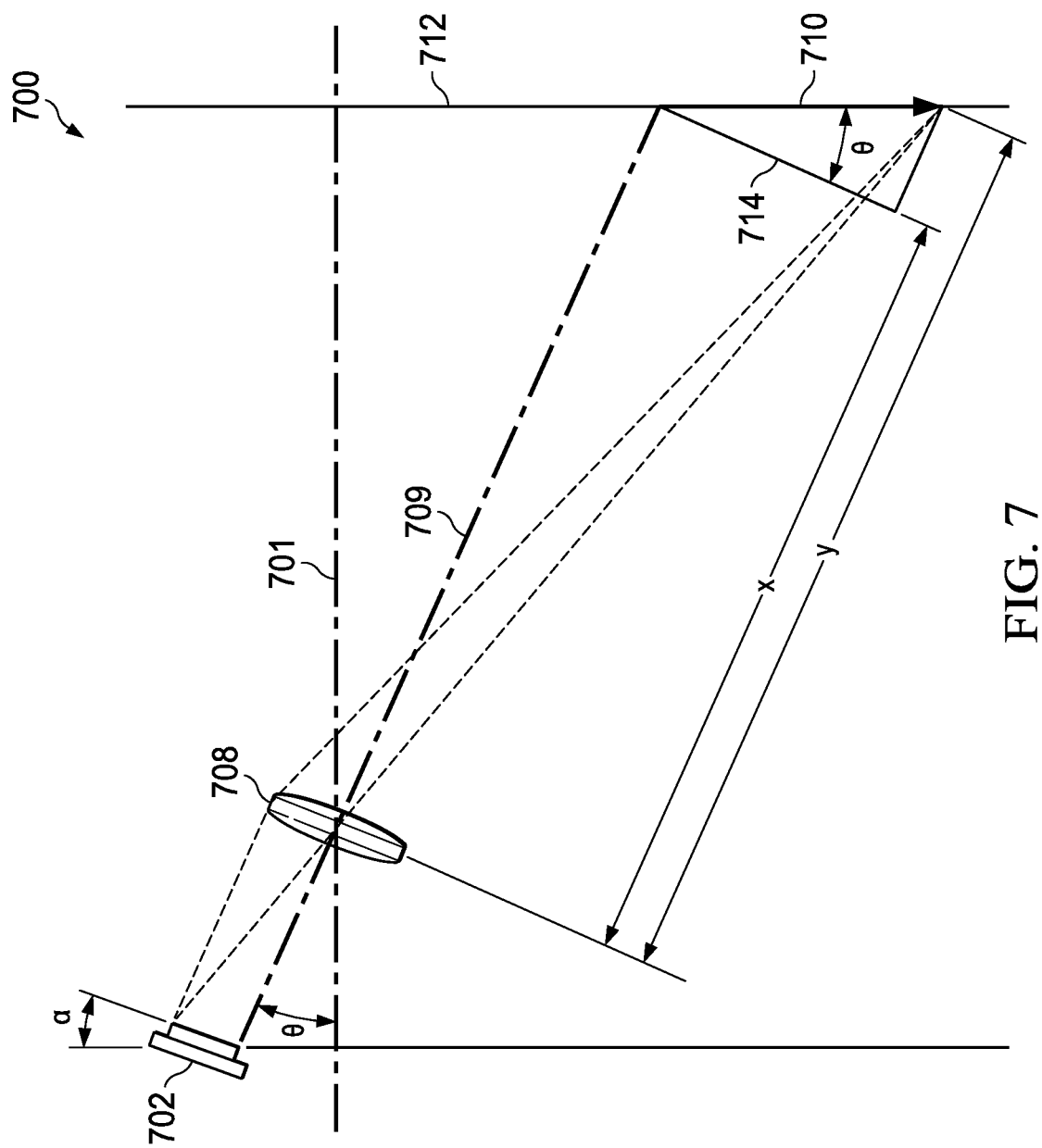
FIG. 7 is a diagram illustrating applying the Scheimpflug principle to an example projection system.

FIG. 7 is a diagram illustrating applying the Scheimpflug principle to an example projection system 700 to correct Scheimpflug defocusing. Spatial light modulator 702 is not perpendicular to the optical axis 709. Rather, the angle α of spatial light modulator 702 is selected so that the projected image 710 projected from spatial light modulator 702 through projection optics 708 is focused on image target 712. In simplified form, the Scheimpflug principle determines the angle α by determining the focal distance separately for the top and bottom of the projected image. In this configuration, the top of the projected image 710 (which is inverted from the top of the image projected by spatial light modulator 702) is a distance y from projection optics 708 and the bottom of projected image 710 is a distance x from projection optics 708. These distances are determined by the distance from projection optics 708 to the image target 712 along optical axis 701 using the angle θ and simple geometry. For example, distance x is determined by Equation 1:

$$x = \frac{d}{\cos \theta} \quad (1)$$

Where d is the distance from projection optics 708 to image target 712. The additional distance of y is determined by a right triangle 714 with the length of projected image 710 as its hypotenuse. Therefore, y is determined by Equation 2:

$$y = x + l \sin \theta \quad (2)$$

Where l is the length of projected image 710 along image target 712. The focal distance is determined by Equation 3:

$$\frac{1}{f} = \frac{1}{u} + \frac{1}{v} \quad (3)$$

Where f is the focal length of the lens, u is the object distance, and v is the subject distance. The subject distances for the bottom and top of the image are x and y, respectively. Solving for u for the top and bottom of spatial light modulator 702 (i.e. the object distances) determines the position of spatial light modulator 702 and thus angle α. Because of the linear nature of Equations 1-3, focusing the top and bottom of the projected image focuses the image along the extent of the projected image.

Figure 8:
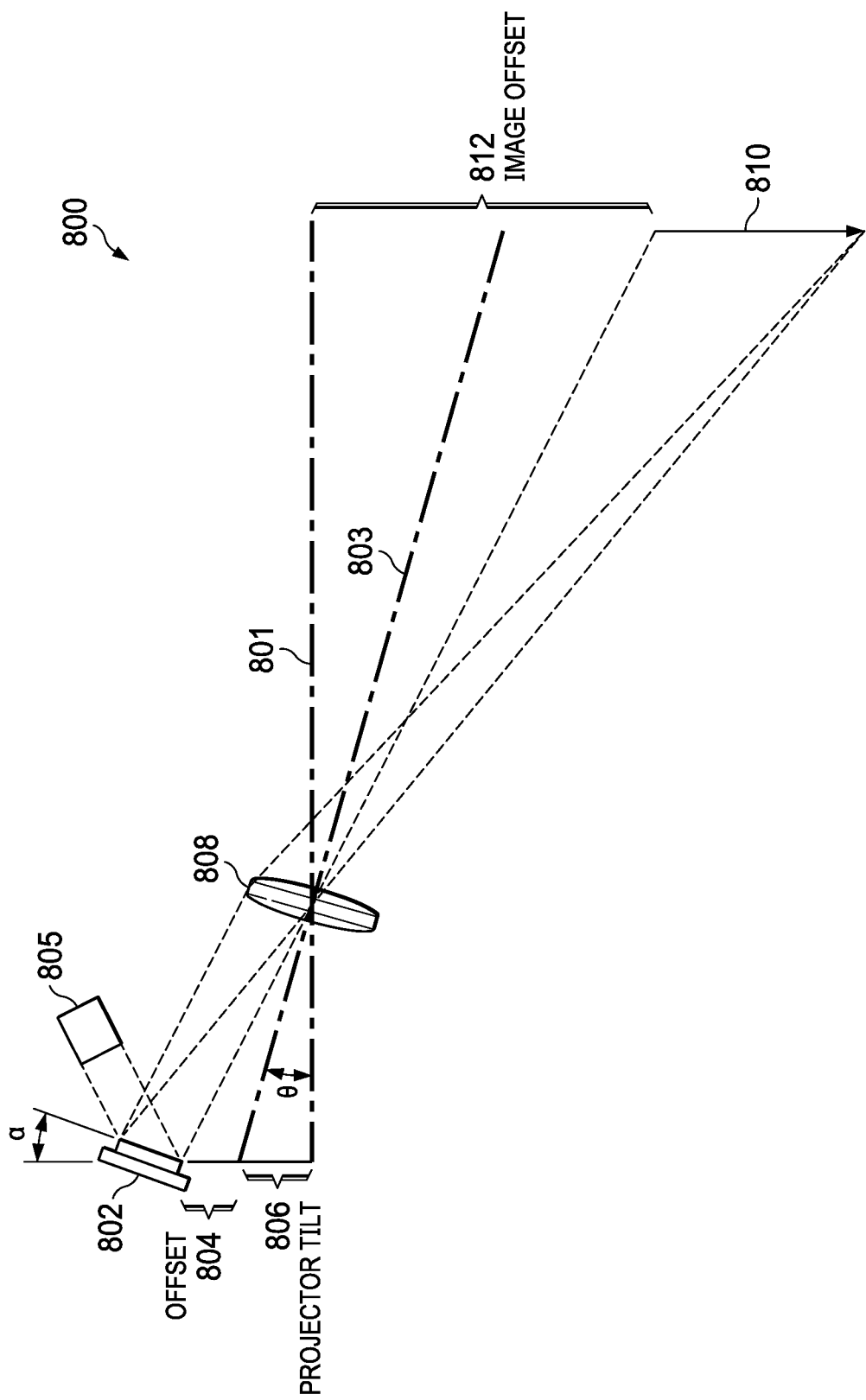
FIG. 8 is a diagram of an example projection system.

FIG. 8 is a diagram of an example projection system 800 that includes an image offset 804, a projector tilt 806 and an image source 802 with a Scheimpflug correction factor α. In an example, image source 802 is a spatial light modulator, such as a digital micromirror device, that provides modulated light that is modulated reflection of a light source 805 reflected off the digital micromirror device. The projector tilt 806 is determined by the relationship between optical axis 801 and projection optics axis 803. Projection optics 808 projects the image from image source 802 to a projected image 810 with an image offset 812. In an example, projection optics 808 includes two lenses or more. A combination of offset distance of the spatial light modulator and the tilt of the optical axis of the projection optics involves trade-offs between reducing the size of the projection optics 808 and lost light intensity due to electronic correction of keystoning. Simulations were performed with various combinations of offsets and projection optics tilt. The simulations include the following assumptions:

Assumptions:
 0.23" image source (DMD) w/F1.7 optics
 20" image diagonal (16:9)
 8" throw distance
 3" image offset The chart below expresses the offset as a percentage of the size of the DMD. The chart below summarizes the results of the simulations:

| Architecture Option | Scheimpflug | | | | Lens |
| --- | --- | --- | --- | --- | --- |
| | Projector Tilt (°) | DMD Tilt (°) | DMD Offset | Image distortion | Diameter (mm) |
| Offset Only | 0.00 | 0.00 | 160% | 0.00% | 14.85 |
| Scheimpflug + 150% offset | 1.89 | 0.02 | 150% | 2.01% | 14.20 |
| Scheimpflug + 125% offset | 7.05 | 0.08 | 125% | 7.27% | 12.75 |
| Scheimpflug + 100% offset | 13.03 | 0.15 | 100% | 13.10% | 11.46 |
| Scheimpflug + 75% offset | 19.88 | 0.23 | 75% | 19.60% | 10.32 |
| Scheimpflug + 50% offset | 27.57 | 0.31 | 50% | 26.87% | 9.90 |
| Scheimpflug + 25% offset | 33.95 | 0.29 | 25% | 35.07% | 9.90 |
| Scheimpflug only | 44.72 | 0.47 | 0 | 44.40% | 10.36 |

In this chart, the image distortion is the percentage of pixels lost due to correction for keystoning. A good compromise from these figures is a 100% offset with a Scheimpflug tilt ($\alpha$) of 0.15°. This provides an image distortion of 13.10% and projection optics with a diameter of 11.46 mm. Different assumptions and different goals will determine different optimization results.

Figure 9:
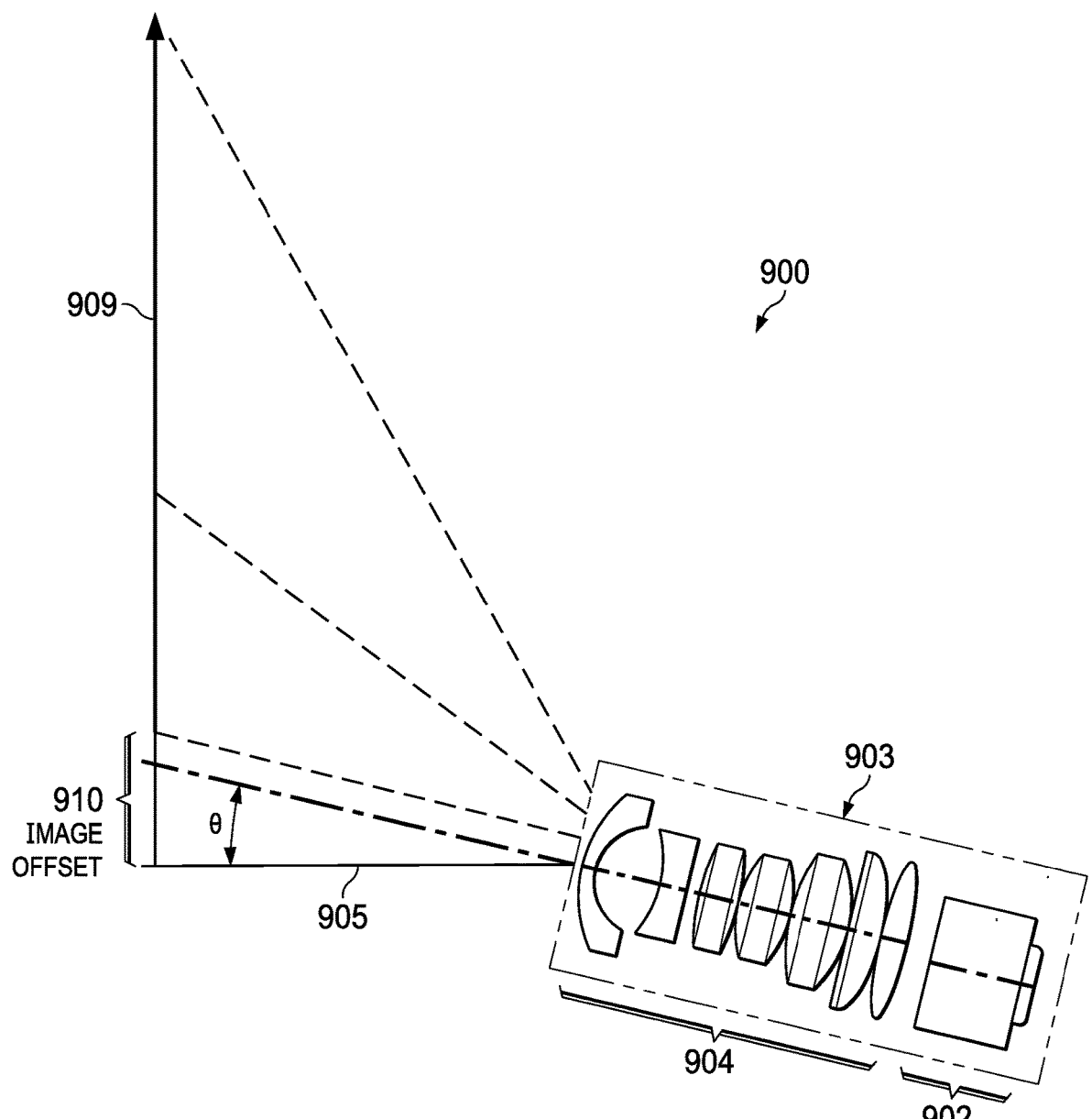
FIG. 9 is an example projection system.

FIG. 9 is an example projection system 900. Spatial light modulator 902 is offset from the optical axis of projection optics 904. In an example, projection optics 904 includes two lenses or more. The optical axis 905 of projection optics 904 is at an angle of $\theta$ relative to horizontal. This produces a projected image 909 with an image offset 910 that allows full view of projected image 909 over projector 903.

Modifications are possible in the described examples, and other examples are possible, within the scope of the claims.

What is claimed is:

1. A projection system comprising:
   projection optics having a projection optics axis at a first angle from an axis perpendicular to an image target, wherein the first angle is greater than zero; and
   an image source optically coupled to the projection optics, the image source having an offset from the projection optics, the image source at a second angle from the projection optics axis, wherein the second angle is greater than zero and the second angle is different than the first angle, wherein the image source is configured to transmit an image to the projection optics, and the projection optics is configured to project the image, to produce a projected image.

2. The projection system of claim 1, wherein the second angle is determined according to a Scheimpflug principle.

3. The projection system of claim 1, wherein the image source is a spatial light modulator.

4. The projection system of claim 3, wherein the spatial light modulator is a digital micromirror device.

5. The projection system of claim 1, wherein the projected image is corrected for keystoning.

6. The projection system of claim 1, wherein the projection optics is configured to invert the image.

7. The projection system of claim 1, wherein the projection optics comprises at least two lenses.

8. A projection system comprising:
   projection optics having a projection optics axis at a first angle from an axis perpendicular to an image target, wherein the first angle is greater than zero; and
   a spatial light modulator optically coupled to the projection optics, the spatial light modulator having an offset from the projection optics, the spatial light modulator at a second angle from the projection optics axis, wherein the second angle is greater than zero and the second angle is different than the first angle, wherein the spatial light modulator is configured to transmit an image to the projection optics, and the projection optics is configured to project the image, to produce a projected image.

9. The projection system of claim 8, wherein the second angle is determined according to a Scheimpflug principle.

10. The projection system of claim 8, wherein the spatial light modulator is a digital micromirror device.

11. The projection system of claim 8, further comprising a light source configured to transmit the image to the spatial light modulator.

12. The projection system of claim 8, wherein the projected image is corrected for keystoning.

13. The projection system of claim 8, wherein the projection optics is configured to invert the image.

14. The projection system of claim 8, wherein the projection optics comprises at least two lenses.

15. The projection system of claim 8, wherein the first angle is greater than the second angle.

16. A method comprising:
    generating, by a spatial light modulator, an image; and
    projecting, by projection optics, the image, to produce a projected image, wherein the projection optics has a projection optics axis at a first angle from an axis perpendicular to an image target, wherein the first angle is greater than zero, wherein the spatial light modulator has an offset from the projection optics, wherein the spatial light modulator is at a second angle from the projection optics, wherein the second angle is greater than zero and the second angle is different than the first angle.

17. The method of claim 16, wherein the projected image is keystone corrected.

18. The method of claim 16, wherein the spatial light modulator is a digital micromirror device, the method further comprising generating, by a light source, the image.

19. The method of claim 16, wherein the projected image projected onto the image target is focused along an extent of the projected image.

20. The method of claim 16, wherein the projection optics comprises at least two lenses.

* * * * *